United States Patent [19]

Gübitz et al.

[11] Patent Number: 5,532,065
[45] Date of Patent: Jul. 2, 1996

[54] COMPOSITE ARTICLE OF A CARRIER LAYER AND DECORATIVE LAYER, AND A PROCESS FOR ITS PRODUCTION

[75] Inventors: Franz Gübitz; Jean-Pierre Nething, both of Kelkeim; Mathias Schremmer, Frankfurt am Main, all of Germany

[73] Assignee: Hoechst Aktiengesellschaft, Germany

[21] Appl. No.: 127,086

[22] Filed: Sep. 27, 1993

Related U.S. Application Data

[63] Continuation of Ser. No. 958,288, Oct. 8, 1992, abandoned.

[30] Foreign Application Priority Data

Oct. 10, 1991 [DE] Germany .......................... 41 33 600.3

[51] Int. Cl.⁶ ...................................................... B32B 27/36
[52] U.S. Cl. .................. 428/480; 428/423.7; 428/903.3; 428/95; 428/287; 428/308.4; 428/316.6; 428/318.4; 428/318.6; 428/319.3; 428/319.7
[58] Field of Search .......................... 428/95, 287, 423.7, 428/480, 903.3, 308.4, 318.6, 319.3, 319.7, 409, 316.6, 318.4

[56] References Cited

U.S. PATENT DOCUMENTS

| | | | |
|---|---|---|---|
| 4,037,013 | 7/1977 | Sprague | 428/310 |
| 4,073,991 | 2/1978 | Focht | 428/138 |
| 4,581,272 | 4/1986 | Walters et al. | 428/88 |
| 4,844,944 | 7/1989 | Graefe et al. | 428/357 |
| 4,877,682 | 10/1989 | Sauers et al. | 428/412 |
| 4,957,804 | 9/1990 | Hendrix et al. | 428/212 |
| 4,966,799 | 10/1990 | Lucca et al. | 428/95 |
| 4,990,382 | 2/1991 | Weissenstein et al. | 428/35.7 |
| 5,106,880 | 4/1992 | Miller et al. | 521/54 |
| 5,128,196 | 7/1992 | Luetkens, Jr. et al. | 428/213 |
| 5,171,625 | 12/1992 | Newton | 428/195 |
| 5,277,969 | 1/1994 | Borri et al. | 428/252 |
| 5,298,321 | 3/1994 | Isoda et al. | 428/288 |
| 5,332,620 | 7/1994 | Hayashi et al. | 428/316.6 |

FOREIGN PATENT DOCUMENTS

| | | |
|---|---|---|
| 0035251 | 9/1981 | European Pat. Off. . |
| 0305219 | 1/1989 | European Pat. Off. . |
| 2829707 | 1/1980 | Germany . |

OTHER PUBLICATIONS

Journal of Polymer Science 54 (1961), pp. 385–410.
Ulmann, 4th Edition (1980), 19, pp. 61–68.
Ulmann, 4th Edition 14, pp. 227–268.
Ulmann, 4th Edition, 19, pp. 317.

*Primary Examiner*—Patrick J. Ryan
*Assistant Examiner*—Marie R. Yamnitzky
*Attorney, Agent, or Firm*—Connolly & Hutz

[57] ABSTRACT

A composite article of a massive carrier layer of a polyester material which can comprise up to 50% by weight of another polymer material which is compatible with it, and if appropriate up to 50% by weight of reinforcing and/or filling additives and other auxiliaries, and a decorative layer, which is built up, if appropriate, from several layers of materials which influence the visual properties and/or haptic properties and which all essentially comprise polyester material, the carrier layer of which is anchored undetachably in the contact area with the layer of material of the decorative layer which is in contact with it, the layers of the composite article in their entirety having a composition such that a homogeneous mixture of the same composition can be employed again to produce a structural element of plastic which has adequate mechanical data, is described.

A process for the production of these composite articles furthermore is described.

8 Claims, No Drawings

COMPOSITE ARTICLE OF A CARRIER LAYER AND DECORATIVE LAYER, AND A PROCESS FOR ITS PRODUCTION

This application is a continuation of application Ser. No. 07/958,288 filed on Oct. 8, 1992 (now abandoned).

The invention relates to a composite article which essentially comprises a thermoplastic polyester and which is built up from a carrier layer and a decorative layer having a textile surface.

The structural elements and components here must meet one or more of the following requirements, depending on their use:

They must be decorative and/or shock-absorbing, have attractive handle properties and take account of safety aspects.

When used in the interior of motor vehicles, even further additional requirements are imposed on the shaped articles, such as low heat aging, UV stability, scuff resistance, pile crush resistance and a high heat distortion temperature.

Some examples for composite articles in practice are, for example, backrest coverings of seating furniture, jewellery box linings and, from the motor vehicle sector, for example pillar and door side coverings.

Combinations of the following materials have usually been used to date for these constructions: acrylonitrile/butadiene/styrene polymers (ABS), polyphenylene oxide (PPO) blends, polyvinyl chloride (PVC), polyurethane (PU), polypropylene (PP), polymethyl methacrylate and wood fiber molding compositions as carrier materials, in combination with textiles. The textile surface material is usually applied to the massive carrier material by adhesive lamination.

The disposal and recycling of components of plastic has since become a central topic for discussion, especially in the automobile sector. Many concepts for reprocessing and reusing waste products of plastic have already been developed. However, recycling of composite systems in which the individual components comprise different polymers presents problems. From this aspect, constructions which are made entirely of the same type of materials have therefore been sought.

However, the limitation to a single type of material has led unavoidably to a limitation of the combination of technical data which can be realized with the composite materials produced therefrom.

It has now been found that readily recyclable composite materials of carrier layers and decorative layers which cover a broad spectrum of advantageous technical properties can be achieved, and that it is not necessary here to dispense entirely with the use of technically advantageous auxiliaries, additives or modifying additions if polyester materials are employed as the base of plastic and the decorative layer and carrier layer are anchored to one another by a fusion process.

The invention thus relates to a composite article of a massive or solid carrier layer of a polyester material which can comprise up to 50% by weight, preferably 5 to 25% by weight, based on the total weight of the polymer materials, of another polymer material which is compatible with it, and if appropriate up to 50% by weight, preferably 10 to 40% by weight, based on the total weight of the mixture, of reinforcing and/or filling additives and other auxiliaries, and a decorative layer, which is built up, if appropriate, from several layers of materials which influence the visual properties and/or haptic properties and which all essentially comprise polyester material, the carrier layer being anchored undetachably in the contact area with the layer of material of the decorative layer which is in contact with it, and the layers in their entirety having a composition such that a homogeneous mixture of the same composition can be employed again to produce a structural element of plastic which has adequate mechanical data.

The layers in their entirety should preferably have a composition such that a homogeneous mixture of the same composition can be employed again to produce a carrier layer of a composite article according to the invention having adequate mechanical data.

Depending on the requirements in respect of visual properites, haptic properties and shock-absorbing properties, the decoration can be built up from several layers, for example from a textile surface, an intermediate layer of a readily deformable, elastic, voluminous, i.e. as a rule 0.5 to 5.0 mm thick, sheet-like structure, such as, for example, a flexible foam sheet or a correspondingly thick non-woven material of staple or continuous fibers, and if appropriate a face liner.

A normal thermoplastic: polyester or a polyester material modified with reinforcing, filler and/or elastomer additives can be employed as the material for the carrier layer, depending on the requirements imposed.

All the known linear or slightly branched polyesters which are capable of crystallization, such as are described, for example, in R. E. Wilfong, J. Polymer Sci. 54, pages 385–410 (1961) or in Ullmanns Enzyklopädie der technischen Chemie (Ullmanns' Encyclopedia of Industrial Chemistry) (4th Edition) Volume 19, pages 61–68 (1980), are in principle possible here. Polyesters which are essentially obtained by cocondensation from aromatic dicarboxylic acids, such as, for example, phthalic acid or isophthalic acid or 1,4-, 1,5- or 2,6-naphthalenedicarboxylic acid, or hydroxy carboxylic acids, such as, for example, para-(2-hydroxyethyl)-benzoic acid, and aliphatic diols having 2 to 6, preferably 2 to 4, carbon atoms, such as, for example, ethylene glycol, 1,3-propanediol or 1,4-butanediol, are suitable for the carrier layer. These polyester raw materials can also be modified by cocondensation of relatively small amounts of aliphatic dicarboxylic acids, such as, for example, glutaric acid, adipic acid or sebacic acid, or of polyglycols, such as, for example, diethylene glycol (2,2-dihydroxydiethyl ether) or triethylene glycol (1,2-di-(2-hydroxyethoxy)ethane), or also of relatively small amounts of higher molecular weight polyethylene glycols.

Polyesters which contain, as the acid component, in addition to terephthalic acid, up to 20 mol percent, preferably up to 10 mol percent, of other aromatic, araliphatic or aliphatic dicarboxylic acids and/or up to 2 mol percent, preferably up to 1 mol percent, of tri- or polyfunctional carboxylic acids and/or which contain, as the diol component, in addition to butylene glycol or, preferably, ethylene glycol, up to 20 mol percent, preferably up to 10 mol percent, of aromatic, araliphatic or other aliphatic diols and/or up to 2 mol percent, preferably up to 1 mol percent, of tri- or polyfunctional alcohols are furthermore suitable.

The dicarboxylic acids referred to here and the tri- or polyfunctional carboxylic acids include, for example, isophthalic acid, phthalic acid, alkyl-substituted phthalic acids, alkyl-substituted isophthalic acids or alkyl-substituted terephthalic acids, naphthalene-dicarboxylic acids, such as, for example, 2,6-naphthalene-dicarboxylic acid and 2,7-naphthalene-dicarboxylic acid, aliphatic dicarboxylic acids, such as, for example, succinic acid, adipic acid, sebacic acid or decanedicarboxylic acid, alicyclic dicarboxylic acids, such as, for example, cyclohexanedicarboxylic acids, trimesic acid, trimellitic acid or pyromellitic acid.

The diol components referred to above or the tri- or polyfunctional alcohols include, for example, trimethylene glycol, 1,2-propanediol, hexamethylene glycol, neopentylglycol, di- or triethylene glycol, 1,4-cyclohexane-dimethanol, 1,4-bis-hydroxy-methyl-cyclohexane, di- or polyhydroxybenzenes, such as, for example, hydroquinone or resorcinol, bisphenols, such as, for example, bisphenol A and bisphenol F, and aromatic diols, such as, for example, ether-diols of bisphenols and glycols, trimethylolpropane or pentaerythritol. Linear oligo- or polyesters or oligo- or polyethers having in each case two terminal hydroxyl groups and molecular weights of up to 10 000 or preferably up to 5 000, particularly preferably up to 2 000, furthermore can be chosen as the diol components. These include, for example, polytetrahydrofurans and polyethylene oxides having molecular weights from 400 to 2 000. The polyester to be employed according to the invention can also comprise up to 20 mol percent, preferably up to 10 mol percent, of hydroxy carboxylic acids, such as, for example, ε-hydroxycaproic acid, hydroxybenzoic acids, hydroxyethylbenzoic acids or hydroxyethoxybenzoic acids, instead of or in addition to these co-components.

In addition to the homopolyesters and the copolyesters based on polybutylene terephthalate or polyethylene terephthalate itself, a mixture of the homo- and copolyesters, such as, for example, a mixture of polybutylene terephthalate and polyethylene terephthalate, or also mixtures of one or more of the homo- or copolyesters referred to with at least one other polyester, such as, for example, mixtures of polyethylene terephthalate and a polyester based on bisphenol A/isophthalic acid/terephthalic acid, can also be employed as the polyester.

However, polyethylene terephthalate (PET), polybutylene terephthalate (PBT), other polyalkylene terephthalates (PTP), high impact polybutylene terephthalate (HI-PBT), thermoplastic polyester elastomer (TPE) and liquid crystal polyester (LCP) are preferred. Another polyester which can also be employed according to the invention is, for example, poly-(cyclohexane-1,4-dimethylol) terephthalate.

The polyesters defined above can of course be processed in the pure form to give the carrier layer of the composite article according to the invention, or they can be mixed with one another in any desired ratios.

For technical reasons, it may be preferable to employ predominantly uniform polymers. Thus, for example, polyethylene terephthalate can be used as the particularly preferred polyester in the pure form or as a mixture with preferably less than 50% by weight of polybutylene terephthalate for production of the carrier layer.

Surprisingly, however, it is also possible to employ mixtures of the polyesters defined above with up to 50% by weight, based on the weight of the mixture, of other compatible polymers and/or elastomers, without noticeable disadvantages for the later recycling.

Compatible polymers which do not belong to the group of polyesters and nevertheless can be mixed with the polyesters defined above are, for example, polycarbonates, acrylonitrile/butadiene/styrene copolymers or methyl methacrylate/butadiene/styrene copolymers.

The polyesters and the mixtures of the polyesters with the compatible polymers mentioned can be employed with or without reinforcing or filling additives. Additives which are employed are talc, chalk, glass fibers, glass beads, wood flour, silicates of, for example, magnesium and/or aluminum, aluminas, carbon blacks, barium sulfate, calcium sulfate, finely divided or fibrous elemental metals, whiskers, wollastonite, dolomite or cellulose, in customary and required amounts of 0 to 50% by weight, preferably 10 to 40% by weight, based on the weight of the total mixture.

The customary additives, such as light and heat stabilizers and costabilizers, coloring agents, pigments, lubricants, flameproofing agents, blowing agents and/or systems for chemical coupling between the polyester and additives, can also be added to the polyesters and the abovementioned filled or non-filled polymer mixtures.

In addition to newly produced ("virgin") products, recycled products of the first, second and higher generations and mixtures of virgin products and recycled products of all the polyesters described above, which, if appropriate, comprise additions and additives and/or are modified by admixing other compatible polymers, are employed as the polyesters. The recycled product can originate from motor vehicle components, drinks bottles, textile waste products and the like.

The decorative layer determines the outer appearance, in particular the visual properties and the haptic properties of the composite articles according to the invention. It is made of, or comprises as the outer layer, a textile material which determines the visual properties and the handle.

However, layers of materials which further improve the haptic properties of the composite articles can also be introduced into the decorative layer.

To improve the adhesion of the decorative layer to the carrier material of the composite article, the decorative layer can have a layer of another textile material, a so-called "face liner", immediately adjacent to the carrier material.

Firm anchoring of the decorative layer to the carrier layer is achieved by fusing the adjacent surfaces of the two layers or, preferably, by penetration of molten carrier composition into a non-molten adjacent surface of the decorative layer.

The composite article according to the invention preferably has a one- to three-layered decorative layer, the outer layer comprising a textile material.

Composite articles which have a two- or three-layered decorative layer, the outer layer comprising a textile material and a layer of a foam, are particularly preferred.

The individual layers of the decorative layer are joined to one another by adhesives or by welding. Suitable adhesives are known polymer dispersions, but preferably known hot melt adhesives, based on polyester, styrene/butadiene, polychloroprene or, in particular, polyurethane, such as are described, for example, in Ullmann, Encyclopädie der technischen Chemie (Encyclopedia of Industrial Chemistry), 4th Edition, Volume 14, pages 227–268, in particular page 257.

Welding is carried out by superficial melting of the surfaces to be joined and subsequent pressing together, for example by flame bonding.

The glued or welded join can be effected over the entire surface, or glued points or welded points uniformly distributed randomly or repetitively over the surfaces to be glued can be generated.

All the textile surfaces which can be anchored to a polyester carrier as described above or bonded to a flexible foam and can be deformed three-dimensionally, according to the type of composite article, are in principle suitable as the textile material of the decorative layer.

The textile layer of the decorative layer comprises polyester yarns, which preferably comprise those polyesters which can be obtained by cocondensation from dicarboxylic acids, such as, for example, terephthalic acid, isophthalic acid or phthalic acid or 1,4-, 1,5- or 2,6-naphthalenedicarboxylic acid, or hydroxy carboxylic acids, such as, for example, para-(2-hydroxyethyl)benzoic acid, and aliphatic diols having 2 to 6, preferably 2 to 4, carbon atoms, such as, for example, ethylene glycol, 1,3-propanediol or 1,4-butanediol. These polyester raw materials can also be modified by cocondensation of relatively small amounts of aliphatic dicarboxylic acids, such as, for example, glutaric acid, adipic acid or sebacic acid, or of polyglycols, such as, for example, diethylene glycol (2,2-dihydroxydiethyl ether) or triethylene glycol (1,2-di-(2-hydroxy-ethoxy)ethane), or of relatively small amounts of higher molecular weight polyethylene glycols.

The textile layer of the composite articles according to the invention preferably comprises a polyester having at least 85 mol % of ethylene terephthalate chain members. Textile layers of pure polyethylene terephthalate or polyethylene terephthalate modified to the extent of not more than 5 mol % are particularly preferred.

The textile sheet-like structures employed as the decorative material in this invention are essentially those which are produced by the weaving, loop, knitting, needling or tufting process.

Non-woven textiles of polyester, so-called non-wovens of staple fibers or continous filaments, can also be used as the decorative material. Thread-woven fabrics which form textile-like surfaces also belong to the possible groups of decorative materials.

Layers of known polyurethane foams (PUR foams) based on polyesters or polyethers containing hydroxyl groups (polyester- or polyether diols) are particularly suitable as materials which can further improve the haptic properties of the composite articles.

Details on particularly suitable PUR foams can be found, for example, in Ullmann, Encyklopädie der technischen Chemie (Encyclopedia of Industrial Chemistry), 4th Edition, Volume 19, page 301 et seq., in particular page 317 et seq.

Relatively thick (voluminous) non-woven textiles of polyester fibers, in particular those which have been prebonded in a manner which is known per se, such as, for example, non-wovens of staple fibers or continuous filaments which are prepared by the fiber weaving, carding or needling process are furthermore suitable for improving the haptic properties.

The face liner which is present, if appropriate, to improve the adhesion of the decorative materials to the carrier material is a textile material which is produced by the weaving, loop and knitting process, or comprises a non-woven textile, a so-called non-woven, of staple fibers or continuous filaments.

The fiber material of the face liner preferably comprises those polyesters such as have been described for the decorative materials, and in an individual case preferably the same fiber material as the textile material of the decorative layer.

Composite articles according to the invention which are of a pure type in respect of the polymer material contained therein, i.e. which comprise only polyesters of the definition given above, are particularly preferred.

The invention also relates to a process for the production of the composite article described above of thermoplastic polyester, comprising at least one massive carrier layer and one decorative layer, in which the carrier layer and decorative layer are brought together and bonded to one another undetachably in a processing process customary for thermoplastics.

In this process, the firm and permanent bond between the carrier layer and decorative layer is achieved by injection molding the molten thermoplastic polyesters intended for the carrier layer directly onto the back of the textile decorative material.

Injection molding machines which allow temperature regulation with an accuracy of ±10° C. and are equipped with corresponding injection molding dyes are employed for the process according to the invention.

The injection molding temperature is set at 20° to 100° C., preferably at 30° to 60° C., above the start of the softening temperature of the carrier material.

The processing temperature of the polymer materials employed for production of the carrier layer, to which the injection molding temperature is to be set, is as a rule 230° to 280° C.

Automatic feeding of the web-like decorative surface to the injection molding machine is particularly advantageous.

The materials for the carrier layer and the decorative layer are chosen within the framework of the abovementioned specifications and structural features such that a homogeneous mixture of the same composition can be employed again to produce a structural element of plastic having adequate mechanical data.

According to the invention, a procedure can be followed here such that a virgin homopolyester or copolyester with or without reinforcing, filler, elastomer and blend additions and stabilizer additives is employed.

However, it is equally possible to employ recycled polyester or polyester containing recycled product for the production of the carrier layer.

In another preferred embodiment of the process according to the invention, the materials for the carrier layer and the decorative layer are chosen within the framework of the abovementioned specifications and structural features such that a composite article of plastic of a pure type is obtained.

The following embodiment examples illustrate the invention.

EXAMPLE 1

A motor vehicle steering column covering was produced from a polyethylene terephthalate (PET) reinforced with 30% by weight of glass fibers as the carrier layer and a textile sheet-like woven fabric of polyethylene terephthalate (PET) with a 2.5 mm thick foam intermediate layer as the decorative layer. The carrier and decorative layer were bonded by the injection molding process by injection molding the plasticized polyester onto the back of the decorative layer in an injection molding dye. The polyester melt had a temperature of 260° to 270° C. The average wall thickness of the carrier layer is 2.5 mm. A specific injection pressure and follow-up pressure was set at 215 bar.

EXAMPLE 2

A hat rack was produced in the same procedure as in Example 1 from a polybutylene terephthalate (PBT) as the carrier layer and a textile circular loop fabric, a 1.5 mm thick foam intermediate layer and a polyester face liner of polyethylene terephthalate (PET). The polyester melt had a melt temperature of 250° C. The average wall thickness of the carrier layer is 2 mm. The specific injection pressure is 185 bar and the specific follow-up pressure is 200 bar.

The hat rack produced was comminuted in a mill. The polyester recycled product obtained was employed again to the extent of 100% for the production of the hat rack carrier layer. With the aid of test specimens taken from these hat racks, it was to be found that, compared with test specimens from hat racks which had been produced using virgin polybutylene terephthalate (PBT) for the carrier layer, no essential change in the mechanical properties of tensile strength and toughness has occurred. In particular, this also applies to the heat distortion temperature.

Hat racks which were produced both from virgin polyester and from polyester recycled product were able to meet unchanged quality requirements. In addition to hat racks having carrier layers of 100% recycled product, experiments were carried out with blends of a 20, 30, 50 and 70% content of virgin polybutylene terephthalate (PBT) and recycled product. As expected, the test values for the tensile strengths and toughnesses were between the values for hat racks of virgin PBT granules and 100% polyester regranulate.

EXAMPLE 3

A trough-shaped tray for a motor vehicle central console is produced as a composite article in 2 process stages from a multi-layer decorative layer and a polyester carrier layer.

The multi-layer decorative layer comprises a textile decorative top layer of polyethylene terephthalate (PET), a polyester foam layer 2.5 mm thick and a face liner, which were bonded to one another by flame bonding. The web-like decorative layer is fed to a calender. The high impact polybutylene terephthalate melt (HI-PBT) which was plasticized in an extruder having a nominal screw diameter of 60 mm and a 120 cm slot die and has a melt temperature of 250° C. is extruded onto the underneath layer of the decorative layer. After the carrier layer 3 mm thick has cooled, sections each 32 cm long and 17 cm wide are cut out of the continuous sheet coated with a textile decoration.

The rectangular sheet thus produced from the composite article is heated on the carrier layer side up to the softening point at about 210° C. in the course of 7 to 15 seconds by radiant heating down to a required carrier layer depth of 2–3 mm at a heating element temperature of 500° to 550° C. Damage to the decoration is suppressed by the very rapid heating, since a very high temperature gradient exists in the foam intermediate layer. The trough-shaped tray for the motor vehicle central console is now produced by forming the composite article in a female/male mold.

EXAMPLE 4

A motor vehicle door side covering was produced by injection molding a plasticized polyethylene terephthalate (PET) recycled product, reinforced with 20% by weight of glass beads, onto the back of a decorative layer with a foam layer by the injection molding process in an injection molding dye. The polyester melt had a temperature of 260° to 270° C. The wall thickness of the carrier layer was 3.0 mm.

The PET recycled product of the carrier layer was obtained from PET reusable drink bottles, which had already been filled several times. These bottles were comminuted, washed, dried and ground. The crude recycled product is processed with 0.2% by weight of sodium montanate as a nucleating agent and with 20% of glass beads to give a compound which can be injection molded, and is then employed for the carrier layer.

The material for the extrusion blow-molding process for bottle production is thus turned into a material which is suitable for the injection molding process.

EXAMPLE 5

An office chair backrest was produced from a polybutylene terephthalate (PBT) as the carrier layer and a decorative top layer, comprising a textile circular loop fabric of polyethylene terephthalate, a foam intermediate layer 4 mm thick and a face liner, which were joined to one another by welding, by the injection molding process by injection molding the plasticized polyester onto the back of the decorative material in an injection mold.

The polyester melt had a melt temperature of 250° C. The average wall thickness of the carrier layer was 2.4 mm. The specific injection pressure was 155 bar and the specific follow-up pressure was 160 bar.

The office chair backrest was now subjected to a recycling process in the same procedure as in Example 2. It was possible to run through the recycling process four times both with partial blending of the recycled product with virgin polybutylene terephthalate (PBT) and with use of 100% recycled product, with the result that it was possible to meet the constantly unchanged quality requirements of the backrest each time.

In another experiment, the office chair backrest recycled product was processed to a polyester/polypropylene blend with 45% by weight of a polypropylene recycled product and compatibilizing agents. Backrests produced with this blend were likewise able to meet the unchanged quality requirements already set with the polyester recycled product.

We claim:

1. A composite article comprising:

a voidless carrier layer comprising a thermoplastic polyester wherein the carrier layer is produced by extrusion or injection molding of a thermoplastic melt, wherein the thermoplastic melt consists essentially of:

a) a thermoplastic polyester, b) optionally, up to 50% by weight based on the total weight of the sum of a)+b) of another polymer material which is compatible with the thermoplastic polyester, and c) optionally, up to 50% by weight, based on the total weight of the carrier layer, of reinforcing additives, filling additives, other auxiliaries or mixtures thereof; and a decorative layer which comprises a plurality of layers, wherein each layer of the decorative layer consists essentially of a polyester material or a polyurethane foam, wherein the polyurethane foam is based on polyesters containing hydroxyl groups or polyethers containing hydroxyl groups;

the outer layer of the decorative layer comprises a textile material;

the carrier layer is firmly secured to the decorative layer which is in contact with it; and each of the layers is formed from a composition which can be recycled to produce a structural element which is mechanically sound.

2. A composite article as claimed in claim 1, wherein the composite article has a two- or three-layered decorative layer and one layer of the decorative layer comprises a foam.

3. A composite article as claimed in claim 1, wherein the individual layers of the decorative layer are joined to one another by gluing or welding.

4. A composite article as claimed in claim 1, wherein the carrier layer comprises virgin homopolyester or copolyester with or without reinforcing, filler, elastomer, blend additions, or stabilizer additives.

5. A composite article as claimed in claim 1, wherein the carrier layer comprises recycled polyester.

6. A composite article as claimed in claim 1, wherein the composite article consists essentially of thermoplastic polyester with respect to the polyester material contained therein.

7. A composite article consisting essentially of:

a voidless carrier layer comprising a thermoplastic polyester wherein the carrier layer is produced by extrusion or injection molding of a thermoplastic melt, wherein the thermoplastic melt consists essentially of:

a) a thermoplastic polyester, b) optionally, up to 50% by weight based on the total weight of a)+b) of another polymer material which is compatible with the thermoplastic polyester, and c) optionally, up to 50% by weight, based on the total weight of the carrier layer, of reinforcing additives, filling additives, other auxiliaries or mixtures thereof; and a decorative layer which comprises a plurality of layers of materials, wherein each layer of the decorative layer consists essentially of either a polyester material or a polyurethane foam, wherein the polyurethane foam is based on polyesters containing hydroxyl groups or polyethers containing hydroxyl groups;

the outer layer of the decorative layer comprises a textile material;

the carrier layer is firmly secured to the decorative layer which is in contact with it; and each of the layers is formed from a composition which can be recycled to produce a structural element which is mechanically sound.

8. A composite article consisting of:

a voidless carrier layer comprising a thermoplastic polyester wherein the carrier layer is produced by extrusion or injection molding of a thermoplastic melt, wherein the thermoplastic melt consists of:

a) a thermoplastic polyester, b) optionally, up to 50% by weight based on the total weight of a)+b) of another polymer material which is compatible with the thermoplastic polyester, and c) optionally, up to 50 % by weight, based on the total weight of the carrier layer, of reinforcing additives, filling additives, other auxiliaries or mixtures thereof; and a decorative layer which consists essentially of a plurality of layers of materials, wherein each layer of the decorative layer individually consists essentially of either a polyester material or a polyurethane foam, wherein the polyurethane foam is based on polyesters containing hydroxyl groups or polyethers containing hydroxyl groups;

the outer layer of the decorative layer comprises a textile material;

the carrier layer is firmly secured to the decorative layer which is in contact with it; and each of the layers is formed from a composition which can be recycled to produce a structural element which is mechanically sound.

* * * * *